United States Patent

Pekar et al.

Patent Number: 5,285,307
Date of Patent: Feb. 8, 1994

[54] VISUAL FIELD EXPANDING SYSTEM

[76] Inventors: Jaroslaw Pekar, 705 Williams Cir., Chapel Hill, N.C. 27516; Robert L. Beadles, 5435 Lakeview Dr., Durham, N.C. 27712

[21] Appl. No.: 854,886

[22] Filed: Mar. 20, 1992

[51] Int. Cl.⁵ .................. G02B 26/08; G02B 26/02
[52] U.S. Cl. .................... 359/201; 359/205; 359/215; 359/232; 250/234
[58] Field of Search .............. 359/232, 212–215, 359/223, 205, 206, 201; 250/234–236

[56] References Cited

U.S. PATENT DOCUMENTS 5,020,891  6/1991  Lichtman et al. ............... 359/368
5,099,363  3/1992  Lichtman ........................ 359/235

Primary Examiner—Scott J. Sugarman
Assistant Examiner—James Phan

[57] ABSTRACT

A field expanding system for producing an expanded field image including a translating slit for a first rotating mirror, and a second mirror which undergoes translation and rotation. The second mirror translates in synchronism with the slit and rotates in synchronism with the first mirror.

7 Claims, 3 Drawing Sheets ated. The present invention therefore results in fusing of partial images to form a single coherent image on the retina of the user, in concert with the proper mapping of these partial images onto an intact (in the case of a normal-vision user) or damaged (in the case of a damaged-retina user) retina.

VISUAL FIELD EXPANDING SYSTEM

BACKGROUND OF THE INVENTION

1. Field of the Invention

The present invention is directed to an optical visual field-expanding system (FES) capable of obtaining a larger field of view than is possible with conventional optical instruments.

2. Discussion of the Background

A wide field of view, conventional optics, prismatic binocular set (e.g. 7×35) has a typical field of view of 500 feet at 1000 yards. Similarly, wearable low-vision telescopes that are currently available have fields of view of no more than 12 to 15 degrees at magnifications of 3× to 4×.

Therefore, it would be beneficial if the field of view in these conventional optic binoculars and telescopes could be expanded.

It has been known in the art to utilize optical scanning systems for scanning a wide incoming field of view as disclosed in U.S. Pat. No. 4,788,423 to Kline. This reference teaches utilizing two rotating mirrors which are synchronized and direct a scanned image onto a sensor with minimal rotation and distortion of the image. However, such a scanning system has not been known which can give adequate field expansion and which can be employed in a binocular or telescope where the image is reflected onto the retina of a viewer.

In an optical system where an image impinges onto the retia of a viewer, the viewer is prevented from maintaining a wide field of view due to the size of the exit pupil of the eye piece lens of the optical system or of the entrance pupil of the eye.

SUMMARY OF THE INVENTION

Accordingly, one object of this invention is to provide an novel field expanding system for optical systems which provides a viewer with an expanded view of an image.

A further object of the present invention is to provide a field expanding system which effectively expands the size of the aperture stop in an optical system.

Yet a still further object of the present invention is to provide a field expanding system which allows a viewer with a damaged retina to have images impinge only on functional areas of the viewer's retina.

These and other objects of the present invention are achieved providing a new and improved imaging apparatus and method in which an entire image of a scene to be viewed is obtained and divided into a set of partial images by passing portions of the entire image through a moving slit, wherein the partial images are then mapped onto the retina of the viewer at a sufficient speed to cause the partial images to fuse into a single coherent image. The present invention therefore results in fusing of partial images to form a single coherent image on the retina of the user, in concert with the proper mapping of these partial images onto an intact (in the case of a normal-vision user) or damaged (in the case of a damaged-retina user) retina.

The FES of the present invention can be compared to the way human beings rotate their heads and/or rotate their eyes in their sockets to obtain a larger field of view than is possible without rotating their heads or eyes.

The difference between the FES of the present invention and a human eye scanning the scene is that the FES sweeps its scan across a field of view sufficiently fast and with the proper timing so as to map partial images onto the retina of a user such that the partial field images of the scene are fused into a single coherent image.

Furthermore, with the FES of the present invention the field of view in a binocular set could be expanded to 1000 feet or more at 1000 yards, which would enhance the usefulness of the binocular set for many applications. Similarly, in wearable low-vision telescopes, utilizing the FES of the present invention could expand the field of view to 30 degrees or more at magnifications of 3× to 4×. Such an FES could also be utilized to provide expanded fields of view in night vision devices, especially night vision goggles.

One application of such a Field Expanding System in the case of a visually-impaired user include FES systems for a person with macular degeneration, who is presented with an individualized, expanded-field image of a scene, in which an image is mapped to those portions of that person's retina which are still known to be still functional. In this case the image may be magnified (typically, in the range of 2× to 8×) to partially compensate for the loss of visual acuity in the macular region. Since the field of view is expanded up to several times over the field afforded by a conventional telescope or binocular, the capability of the wearer to perform tasks such as driving an automobile is greatly improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
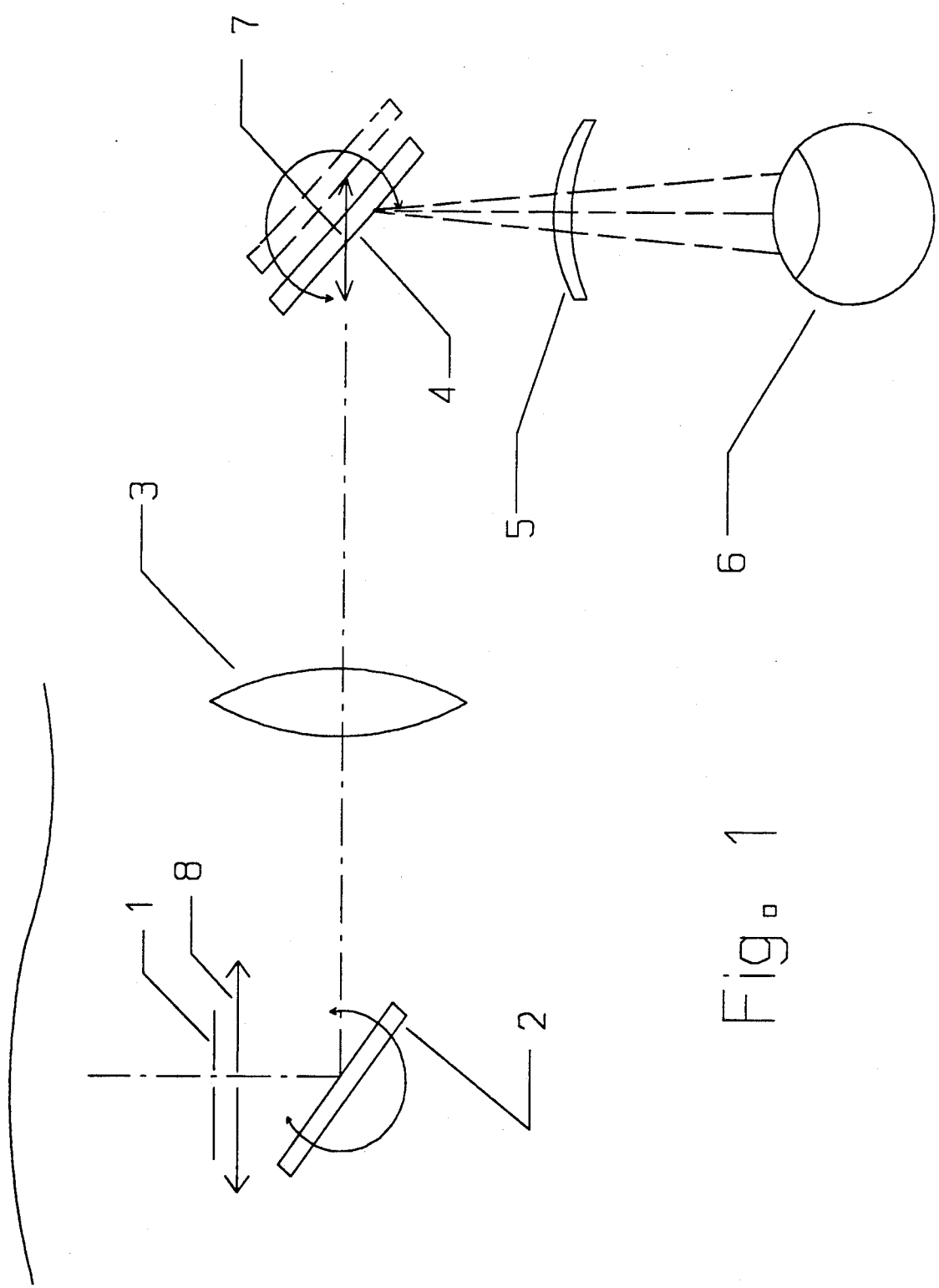
FIG. 1 represents a schematic diagram of the field expanding system of the present invention.

Referring now to the drawings, wherein like reference numerals designate identical or corresponding parts throughout the several views, and more particularly to FIG. 1 thereof, which schematically details the field expanding system (FES) of the present invention. The field expanding system of the present invention can operate with or without scene magnification, depending on the particulars of the FES design. In FIG. 1, light emanating from a visual scene impinges on a translating slit 1 which allows part of the visual scene to pass through it thereby generating a partial image scene. As slit 1 translates in the directions indicated by arrow 8, successive and sequential partial scene images will pas through slit 1. The partial scene images which pass through slit 1 then strike mirror 2, which constantly rotates through an arc area whose extent is chosen as an FES design feature. That is, mirror 2 can either rotate through 360 degrees, i.e., a complete rotation, or may need only to rotate through a smaller arc area, so long as the smaller arc area can reflect the entire partial image signal. The speed of translation of slit 1 and the rotation of mirror 2 are design features which are chosen to produce an adequate number of sets of partial images for effective fusion into a full scene, for example, a speed and rate which are sufficient to produce 30 complete scene sets per second; where a complete scene set is the set of partial images which make up one complete image. An alternative arrangement combines slit 1 and mirror 2 into a rotating ribbon mirror, in which the ribbon mirror height equals the height of mirror 2 and ribbon mirror width equals the width of slit 1.

The partial scene images which pass through slit 1 and then reflect of mirror 2 are directed to mirror 4 through objective lens 3. Mirror 4 operates to rotate and translate in synchronism with slit 1, as mirror 4 maps each partial scene image through eyepiece lens 5 and then on to a viewer's eye 6. That is, this mirror 4 simultaneously rotates in an arc and translates in the directions indicated by arrow 7 in FIG. 1. Mirror 4 will translate in concert with slit 1. That is, mirror 4 will translate in the same direction and at the same speed as slit 1. By combining translation with rotation, mirror 4 will produce images on a portion of the viewer's eye, more specifically a viewer's retina, that without translation would be blocked by the exit pupil of the eyepiece lens or the entrance pupil of the eye. Mirror 4 also rotates at the same rate as mirror 2 and through an arc area whose extent is also chosen as an FES design feature and which is in concert with that for mirror 2. The rotating mirrors 2 and 4 should also rotate such that those mirrors 2 and 4 are always parallel to one another. Controlling mirrors 2 and 4 to rotate in unison can be effected by any conventional means such as utilizing a vibrating mirror electrometer to rotate the mirrors at high speed in conjunction with a crystal controlled source to control the timing of the rotation of the mirrors. Such control devices may be under the control of a microprocessor.

With the operation of the present invention as described above, each slit-produced partial image is followed in rapid succession by another whose left edge coincides with the right edge of the previous partial image until one full image, i.e., a complete set of partial images, is produced, and then this sequence repeats itself. The full fused-image scene can also be magnified or not depending on the chosen focal lengths and locations of lenses 3 and 5.

In the preferred embodiment of FIG. 1 described above, each partial image is a vertical segment of the scent to be imaged presently separately at the same location on the retina of the user and at a repetition rate which causes each partial image to fuse with the adjacent partial images to produce a coherent, whole image. The formation of the FES fused image may be compared to the formation of a television image in which the vertical image segment formed on the retina of the user by the FES is analogous to a horizontal scan line formed on a T.V. screen by the scanning electron beam. A T.V. image is "painted" via a sequence of partial horizontal images (the horizontal scan lines) onto the phosphor of a cathode ray tube (CRT) as the FES image is "painted" via a sequence of partial vertical images onto the retina of the wearer of the FES. Since the full scene image of the FES is to be perceived by the eye/brain of the wearer, the requirements of its scanning rate of the partial vertical images is on the same order as for a T.V. Hence, 30 or more full sets of partial images are required per second for effective fusion into a coherent whole image without noticeable image flicker.

Figure 2:
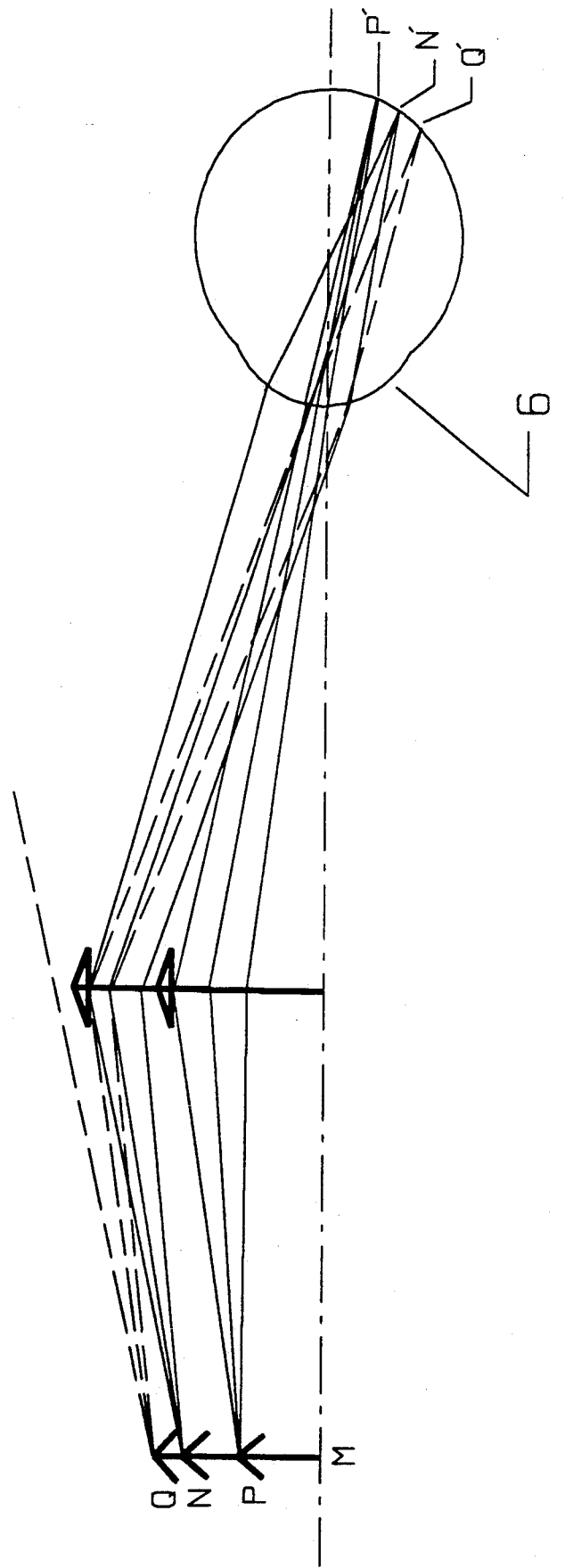
FIG. 2 illustrates schematically how the present invention operates to effectively enlarge the aperture stop of an optical viewing system.

Turning now to FIG. 2 which schematically illustrates how the combined motions of translation and rotation of the present invention produce an image and effectively expand the size of an aperture stop in an optical viewing system. For simplicity of illustration, only the principal rays for three points of a scene are shown, specifically, points P, N, and Q. Also for simplicity, the principal rays are shown for only one side of the optical axis. As shown in FIG. 2, point P of a scene to be viewed is imaged through an aperture stop to point P' onto the retina of a viewer. Dependent on the size of the aperture stop, scene points N and Q will be imaged to image points N' and Q', respectively. If the aperture stop only extends to location F in the figure, only the principal ray from point P will pass through and be imaged onto the retina of the viewer. If, however, the aperture stop is enlarged to be at location E, then the principal ray from point N will pass unattenuated through the aperture stop and be imaged at full brightness at point N', while the image of point Q will pass through the aperture stop although somewhat attenuated by the aperture stop.

By utilizing the system of FIG. 1 and using the motions of both translation and rotation for the mirror 4, the effective size of the aperture stop can be expanded beyond location F. The translation and rotation motion of mirror 4 effectively increases the size of the aperture stop by effectively moving the location of the scene to be imaged, and consequently the points P, N, and Q all can be imaged onto the retina of the viewer through a smaller aperture stop, albeit at reduced brightness. That is, by rotating and translating mirror 4 points Q and N are effectively moved toward the optical axis such that the rays from these points will pass through the aperture stop, thereby effectively enlarging the aperture stop.

Figure 3:
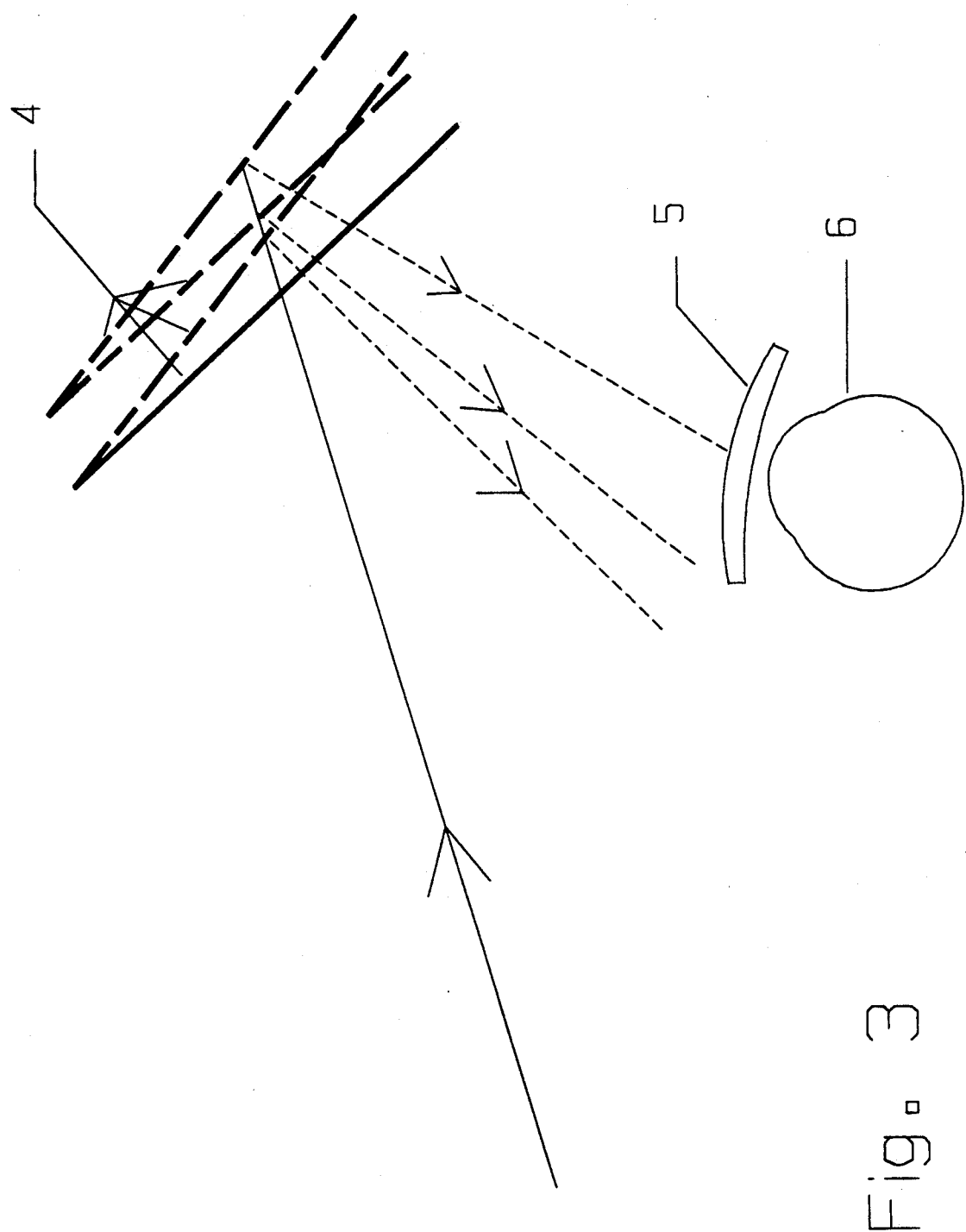
FIG. 3 shows schematically how a combination of mirror translation and rotation can capture scene information that would be missed without both translation and rotation.

FIG. 3 provides clarification of the necessity for both translation and rotation of mirror 4. In the figure, mirror 4 is shown translating from left to right and rotating counterclockwise. As illustrated, the limiting ray would be outside the exit pupil of the eyepiece lens for either translation or rotation, but the combination of both translation and rotation can direct the ray to a position well within the exit pupil and thereby onto the retina of the viewer.

Furthermore, by utilizing the FES of the present invention, the location on the retina of where the partial images are mapped may be controlled. In this way, if the retina of the viewer is damaged, the mapping of the partial images can be controlled such that the partial images will only impinge on the functional portions of the retina of the viewer. In the present invention, this can be accomplished by modifying the translation of mirror 4 in concert with slit 1. This process will involve first testing a viewer's retina to determine which regions are still functional. Then, mirror 4 will be translated in a manner so as to only reflect the viewed image to those still functional areas. In this way, mirror 4 will not translate in unison with slit 1 but will instead move incrementally between positions which result in causing the viewed image to impinge on functional retinal portions of the viewer.

Obviously, numerous modifications and variations of the present invention are possible in light of the above teachings. It is therefore to be understood that within the scope of the appended claims, the invention may be practiced otherwise than as specifically describe herein.

What is claimed as new and desired to be secured by Letters Patent of the United States is:

1. An imaging apparatus employing a translating slit through which pass successive partial image signals of a scene to be viewed, said apparatus further including
   a first mirror optically coupled to said translating slit and rotating in concert with translation of said slit for reflecting said partial image signals along an optical axis during translation of said slit,
   a second mirror optically coupled along said optical axis to said first mirror and rotating and translating in concert with translation of said slit for further reflecting said partial image signals onto a predetermined location,
   a first relay lens that provides said optical coupling between first and second mirrors, and
   a second relay lens placed between said second mirror and said predetermined location to focus said reflected partial image signals onto said predetermined location.

2. An imaging apparatus as in claim 1 in which the second relay lens is a television camera lens, making said predetermined location the TV camera tube or equivalent photodetector.

3. An imaging apparatus as in claim 1 in which the second relay lens is an eyepiece lens, making said predetermined location the retina of the eye.

4. A method of imaging a scene to be viewed onto a predetermined location, comprising the steps of:
   translating a slit through which pass only successive partial image signals of said scene to be viewed;
   rotating a first mirror optically coupled to said translating slit in concert with said translating of said slit and reflecting said successive partial image signals along an optical axis;
   rotating and translating along said optical axis a second mirror optically coupled to said first mirror, in concert with said translating of said slit and further reflecting said successive partial image signals reflected by said first mirror to said predetermined location; and
   projecting said successive partial image signals onto said predetermined location in adjacent succession so that said successive partial image signals fuse into a single image of the scene to be viewed.

5. The method according to claim 4, wherein said step of projecting said successive partial image signals is comprised of:
   placing a first relay lens along said optical axis between said first and second mirrors to direct said reflected partial image signals onto said second mirror using said relay lens;
   placing a second relay lens between said second mirror and said predetermined location to direct said partial image signals onto said predetermined location.

6. The method according to claim 4 in which said predetermined location is the photodetector of a television camera.

7. The method according to claim 4 in which said predetermined location is the retina of the eye.

* * * * *